(12) United States Patent  (10) Patent No.: US 8,797,735 B2
Ge et al.  (45) Date of Patent: Aug. 5, 2014

(54) ELECTRICAL DEVICE HAVING HINGED STRUCTURE

(75) Inventors: Hai-Qian Ge, Shenzhen (CN); Yue-Ping Liu, Shenzhen (CN); Che-Yu Chou, New Taipei (TW); Qun Huang, Shenzhen (CN); Tai-Shan Zhu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 188 days.

(21) Appl. No.: 13/304,317

(22) Filed: Nov. 24, 2011

(65) Prior Publication Data

US 2013/0027865 A1 Jan. 31, 2013

(30) Foreign Application Priority Data

Jul. 25, 2011 (CN) .......................... 2011 1 0208581

(51) Int. Cl.
  *G06F 1/16* (2006.01)
  *G06F 3/02* (2006.01)
  *H04M 1/00* (2006.01)
  *E05D 3/06* (2006.01)
  *E05D 3/10* (2006.01)

(52) U.S. Cl.
  USPC ............ 361/679.55; 361/679.06; 361/679.07; 361/679.16; 361/679.26; 361/679.27; 361/679.56; 345/168; 345/169; 345/905; 455/575.1; 455/575.3; 16/366; 16/367

(58) Field of Classification Search
  USPC ............. 361/679.55–679.59, 679.01–679.45; 345/156, 157, 168, 169, 905; 16/366, 16/367; 455/575.1, 575.3
  See application file for complete search history.

(56) References Cited

U.S. PATENT DOCUMENTS

| | | | |
|---|---|---|---|
| 6,983,175 B2 * | 1/2006 | Kwon | 455/575.1 |
| 7,146,197 B2 * | 12/2006 | Kang et al. | 455/575.1 |
| 7,327,561 B2 * | 2/2008 | Chen | 361/679.27 |
| 7,380,313 B2 * | 6/2008 | Akiyama et al. | 16/367 |
| 7,433,468 B2 * | 10/2008 | Chang | 379/433.13 |
| 7,559,117 B2 * | 7/2009 | Chien | 16/367 |
| 2004/0110529 A1 * | 6/2004 | Watanabe et al. | 455/550.1 |
| 2004/0192422 A1 * | 9/2004 | Watanabe et al. | 455/575.3 |
| 2007/0279386 A1 * | 12/2007 | Lewis et al. | 345/168 |

* cited by examiner

*Primary Examiner* — Nidhi Desai
(74) *Attorney, Agent, or Firm* — Novak Druce Connolly Bove + Quigg LLP

(57) ABSTRACT

An exemplary electrical device includes a first main body; a second main body; and a rotatable mechanism pivotally connected the first main body and the second main body. The rotatable mechanism includes a first rotation unit and a second rotation unit. The first rotation unit is capable of making the first main body rotate around a second rotation axis in a plane perpendicular to the second rotation axis. The second rotation unit is capable of making the first main body rotate relative to the second main body around a first rotation axis.

18 Claims, 8 Drawing Sheets

ELECTRICAL DEVICE HAVING HINGED STRUCTURE

BACKGROUND

1. Technical Field

The present disclosure relates to electrical devices, and more particularly, to an electrical device with a hinged structure that employs two axes of rotation.

2. Description of Related Art

In recent years, small, thin, fold-type electrical devices such as a fold-type mobile phone have become popular. However, the fold-type mobile phone is normally used in an open state, and typically can only perform a few functions when in a closed state. Therefore, the typical fold-type mobile phone may be inconvenient for a user.

Thus, a new electrical device is desired to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views, and all the views are schematic.

DETAILED DESCRIPTION

Reference will now be made to the drawings to describe various inventive embodiments of the present disclosure in detail, wherein like numerals refer to like units throughout.

Figure 1:
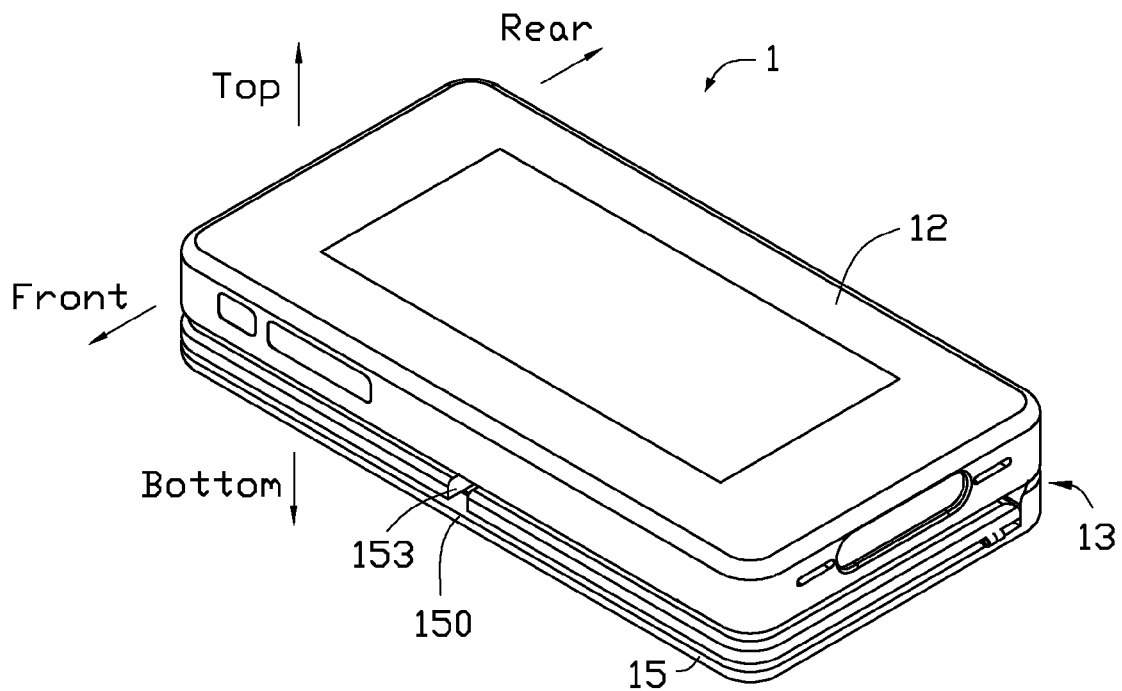
FIG. 1 is an isometric view of an electrical device in an initial state in accordance with one embodiment; the electrical device including a first main body, a second main body, and a rotatable mechanism connecting the first main body with the second main body.
Figure 2:
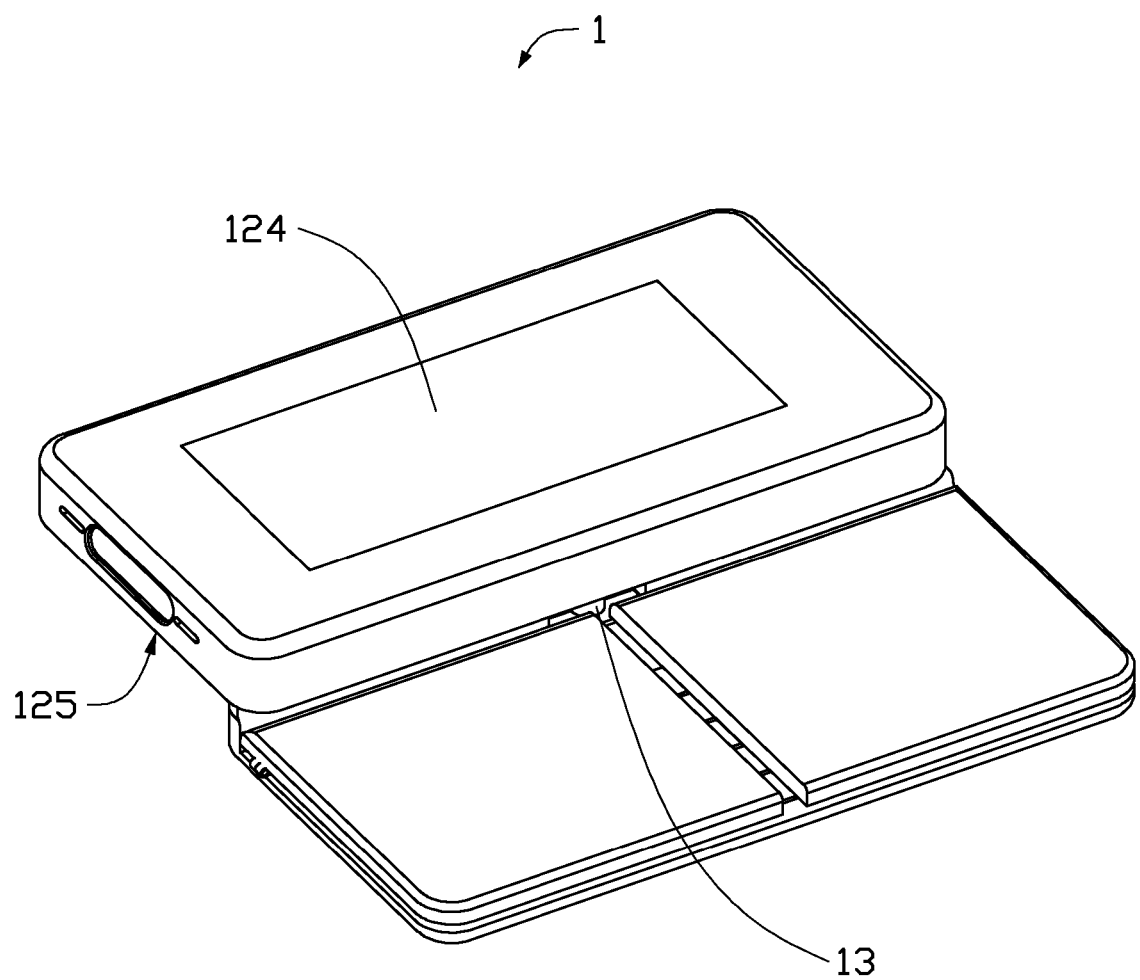
FIG. 2 is an isometric view of the electrical device of FIG. 1 in a use state, wherein the first main body has been rotated 180 degrees from its position in the initial state, the rotation being in a plane parallel to a main surface of the first main body.
Figure 3:
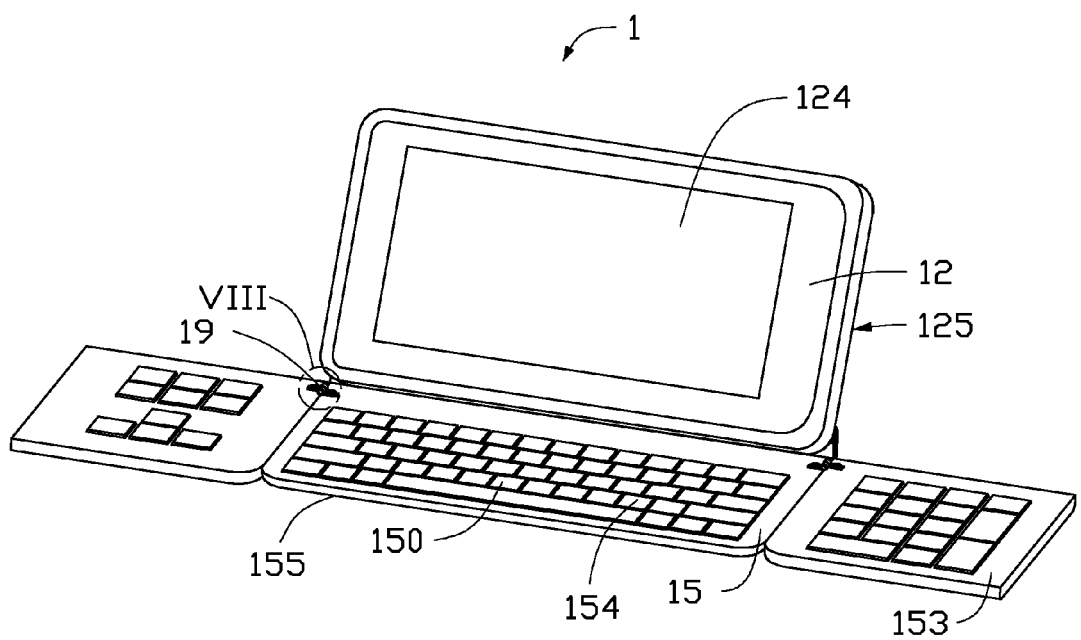
FIG. 3 is another isometric view of the electrical device of FIG. 1 in the use state, but wherein, inter alia, the first main body has been further rotated from its position in FIG. 2, the rotation being upward at an angle relative to the second main body.
Figure 4:
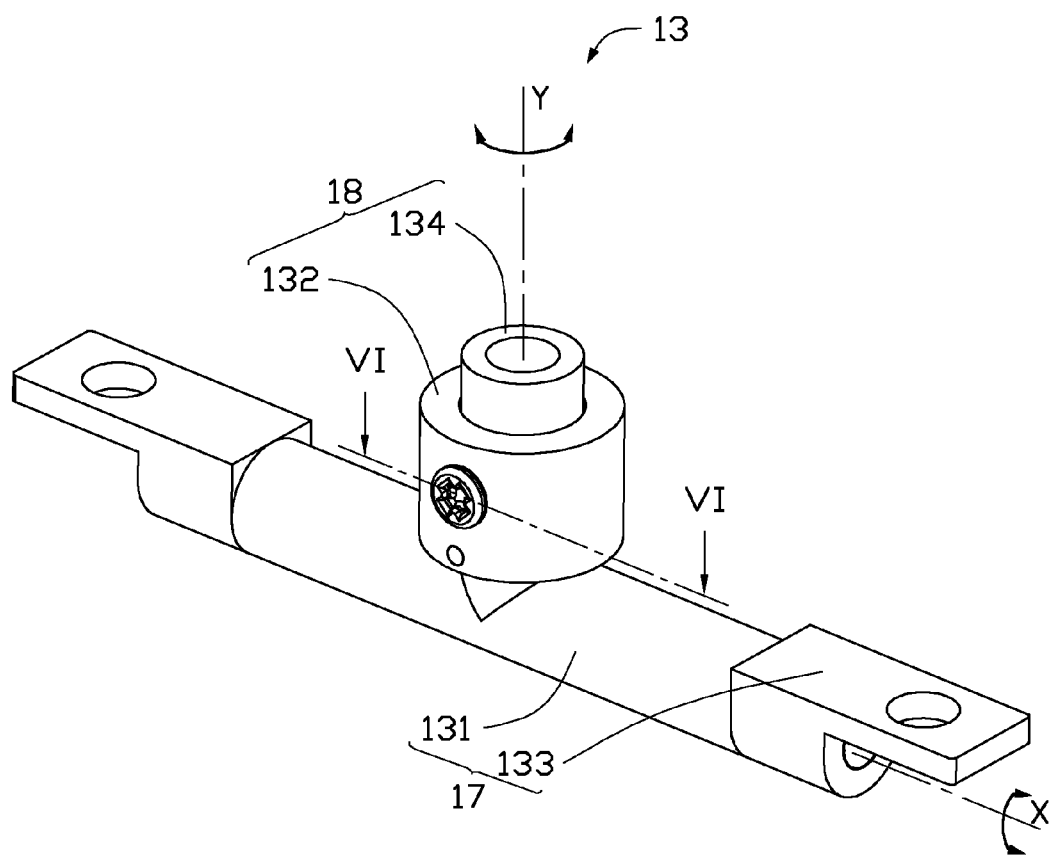
FIG. 4 is an enlarged, isometric view of the rotatable mechanism of the electrical device of the embodiment.

Referring to FIG. 1 through FIG. 3, an electrical device 1 according to one embodiment of the present disclosure is shown. The electrical device 1 includes a first main body 12, a second main body 15, and a rotatable mechanism 13. The rotatable mechanism 13 is configured to connect the first main body 12 with the second main body 15 and allow the first main body 12 to rotate relative to the second main body 15 around at least two different rotation axes. In this embodiment, the two different rotation axes are defined as a first rotation axis "X", and a second rotation axis "Y" perpendicular to the first rotation axis "X", as shown in FIG. 4. The first rotation axis "X" is parallel to a jointing line of the first main body 12 and the second main body 15, and near where a bottom rear edge of the first main body 12 abuts a top rear edge of the second main body 15. In other words, the first rotation axis "X" is parallel to adjacent edges of the first main body 12 and the second main body 15. The electrical device 1 can be folded up into an initial state and opened to a use state when the first main body 12 rotates relative to the second main body 15 via the rotatable mechanism 13.

In this embodiment, the electrical device 1 is a mobile phone. The first main body 12 may be a touch display. The first main body 12 includes a top display surface 124 (defined as a main surface) and a bottom surface 125 at opposite sides thereof. At least one of the display surface 124 and the bottom surface 125 is perpendicular to the second rotation axis "Y". The second main body 15 may be a keyboard device, and includes a keypad surface 154 and a supporting surface 155 at opposite sides thereof. The second main body 15 also includes a central primary body 150, and two auxiliary bodies 153 corresponding to left and right sides of the primary body 150, respectively. The auxiliary bodies 153 are rotatably connected to opposite lateral left and right sides of the primary body 150 by two hinges 19, respectively. In alternative embodiments, the first main body 12 may be a liquid crystal display panel or an organic electroluminesence display panel. The second main body 15 may be a keyboard device or a touch panel.

When in the initial state, the electrical device 1 is folded up and the first main body 12 overlies the second main body 15. The display surface 124 and the supporting surface 155 face towards the outside of the electrical device 1, and the bottom surface 125 overlies the keypad surface 154 of the second main body 15 or resists the second main body 15. In the present embodiment, the bottom surface 125 directly overlies and is spaced a small distance from the two auxiliary bodies 153. The first main body 12 cannot rotate around the first rotation axis "X". The electrical device 1 can perform most functions in the initial state, since the touch display faces towards the outside and can be observed and operated by a user.

When the first main body 12 rotates 180 degrees around the second rotation axis "Y" in a plane parallel to the display surface 124, the first main body 12 is positioned at a rear side of and parallel to the second main body 15, as shown in FIG. 2. Then the auxiliary bodies 153 can be rotated about the hinges 19 up from the primary body 150, and thus unfolded 180 degrees from the primary body 150 to positions at the two lateral sides of the primary body 150, as shown in FIG. 3. In this position, the electrical device 1 is defined as being in the use state. In the use state, the display surface 124 and the keypad surface 154 are spread open and observable and directly accessible by the user. In this state, the bottom surface 125 and the supporting surface 155 can be held in the palm of the user's hand for supporting the electrical device 1.

In the use state, the first main body 12 can be further rotated an angle in range of 0~90 degrees, around the first rotation axis "X". In one preferred embodiment, the first main body 12 is rotated 45 degrees relative to the second main body 15 around the first rotation axis "X", such that a preferred included angle of 135 degrees is defined between the first main body 12 and the second main body 15.

Referring also to FIG. 4, the rotatable mechanism 13 includes a first rotation unit 18 mounted to the first main body 12, and a second rotation unit 17 mounted to the second main body 15. The first rotation unit 18 includes a first shaft sleeve 132 and a first shaft 134. A bottom end of the first shaft 134 is rotatably received in the first shaft sleeve 132. The other top end of the first shaft 134 is configured for being fixed to a bottom of the first main body 12 near the bottom rear edge of the first main body 12. The first shaft 134 can rotate relative to the first shaft sleeve 132 around the second rotation axis "Y".

The second rotation unit 17 includes a second shaft 131, and two second shaft sleeves 133 rotatably receiving two reduced ends (i.e., end pins) of the second shaft 131. A middle part of the second shaft 131 is fixed to a bottom end of the first shaft sleeve 132. A combination of the first rotation unit 18 and the second shaft 131 is rotatable relative to the two second shaft sleeves 133 around the first rotation axis "X". In this embodiment, the first shaft sleeve 132 is perpendicular to the second shaft 131.

Figure 5:
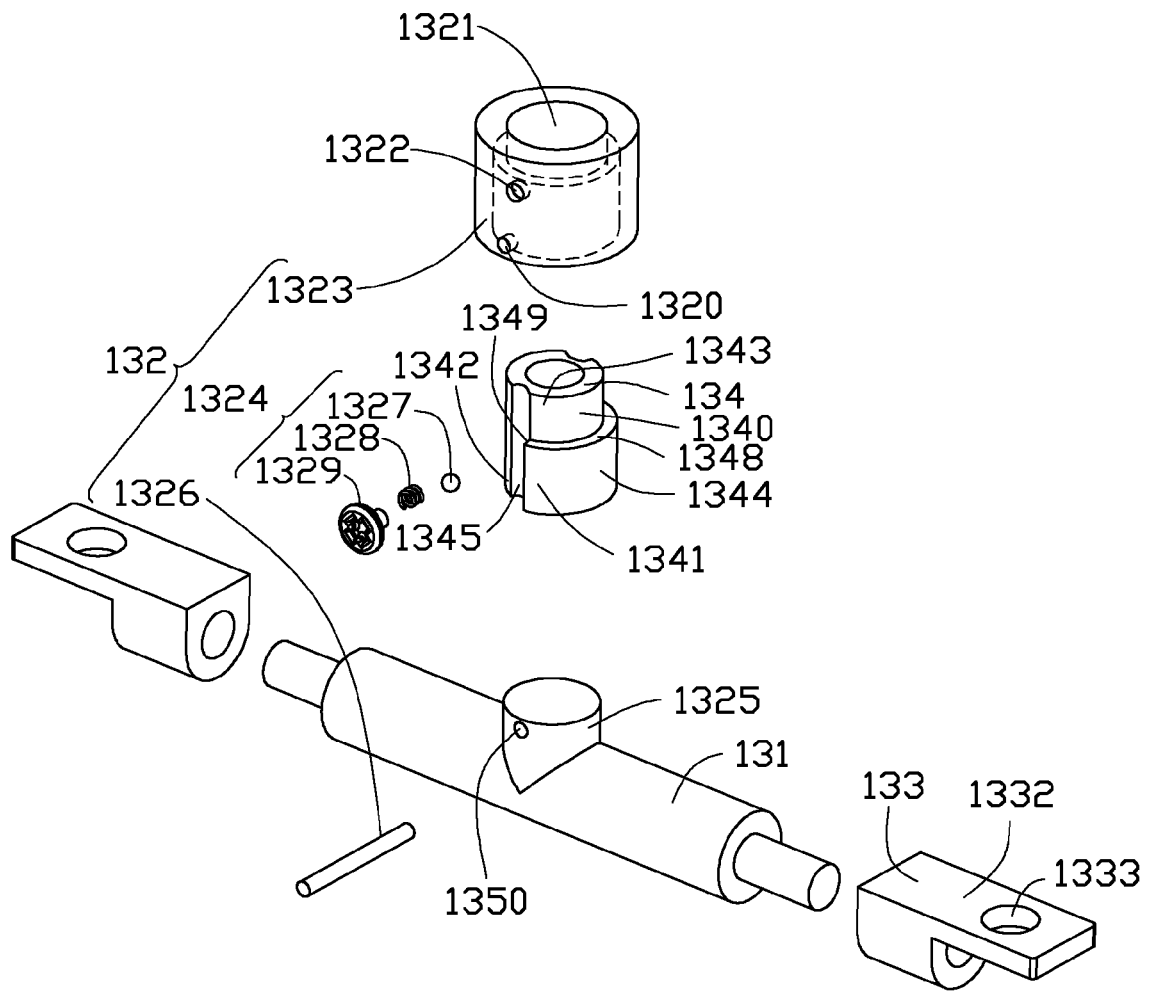
FIG. 5 is an exploded view of the rotatable mechanism of FIG. 4.

Referring also to FIG. 5, each second shaft sleeve 133 includes a connecting part 1332 extending from a main body thereof. In this embodiment, the connecting part 1332 includes a mounting hole 1333. In assembly, the two ends of the second shaft 131 are rotatably received in the second shaft sleeves 133, and the connecting parts 1332 are then fixed to a rear side of the second main body 15 by way of screws (not shown) extended through the mounting holes 1333.

The first shaft sleeve 132 includes a cylindrical holding shell 1323, a blocking unit 1324, a supporting body 1325, and a fixing pole 1326. The supporting body 1325 extends up from the middle part of the second shaft 131. In this embodiment, the supporting body 1325 has a generally cylindrical shape. A first fixing hole 1350 is transversely defined through the supporting body 1325.

The holding shell 1323 includes an internal step (not labeled), a first (bottom) end (not labeled) defining a first opening (not labeled) with a first internal diameter, and a second (top) end (not labeled) defining a second opening 1321 with a second internal diameter. In this embodiment, the first internal diameter is larger than each of the second internal diameter and an outer diameter of the supporting body 1325. The internal step is defined in an internal wall of the holding shell 1323 where the first opening meets the second opening 1321. A blocking hole 1322 is defined in approximately a middle part of a wall of the holding shell 1323. Two second fixing holes 1320 (only one shown) are defined in opposite sides of the wall of the holding shell 1323 at the first end of the holding shell 1323, the second fixing holes 1320 corresponding to the first fixing hole 1350. In assembly, the first end of the holding shell 1323 sleeves the supporting body 1325, and is fixed to the supporting body 1325 by the fixing pole 1326 passing through the first fixing hole 1350 and the two second fixing holes 1320.

The first shaft 134 is step-shaped, and includes an upper, hollow shaft part 1340 and a lower, solid blocking part 1344 connecting with the shaft part 1340. The blocking part 1344 includes a first semi-cylindrical surface 1341, a second semi-cylindrical surface 1342, and a pair of flat blocking surfaces 1349 connected between the first semi-cylindrical surface 1341 and the second semi-cylindrical surface 1342. In this embodiment, a diameter of an imaginary cylinder of which the first semi-cylindrical surface 1341 is a part is larger than a diameter of an imaginary cylinder of which the second semi-cylindrical surface 1342 is a part. The diameter of the imaginary cylinder of which the first semi-cylindrical surface 1341 is a part is also larger than the second internal diameter of the holding shell 1323, and is a little smaller than the first internal diameter of the holding shell 1323.

The shaft part 1340 extends from a top surface 1348 of the blocking part 1344. The shaft part 1340 may be a cylinder, which has an outer diameter slightly smaller than the second internal diameter of the holding shell 1323. The shaft part 1340 has an outer cylindrical surface 1343, a part of which is coplanar with the second semi-cylindrical surface 1342 of the blocking part 1344, as shown in FIG. 5. Two opposite vertical, straight grooves 1345 are defined in an outer wall of the first shaft 134. That is, the grooves 1345 extend along directions parallel to the second rotation axis "Y". At the shaft part 1340, the grooves 1345 are defined in the outer cylindrical surface 1343. At the blocking part 1344, each groove 1345 is located between the second semi-cylindrical surface 1342 and the corresponding flat blocking surface 1349. The top surface 1348 of the blocking part 1344, uncovered by the shaft part 1340, defines an outer step corresponding to the internal step of the holding shell 1323. The outer step is configured for preventing the first shaft 134 from sliding out from the holding shell 1323.

In this embodiment, the blocking unit 1324 is an elastic nail and includes a screw 1329, an elastic member 1328, and a resisting unit 1327. In one embodiment, the elastic member 1328 is a coil spring, and the resisting unit 1327 is a small ball corresponding to the width of each of the grooves 1345. Also referring to FIG. 6 and FIG. 7, the screw 1329 includes a head part 1394 and a pole part 1395. The elastic member 1328 is fixed to an inner end of the pole part 1395 of the screw 1329.

Figure 6:
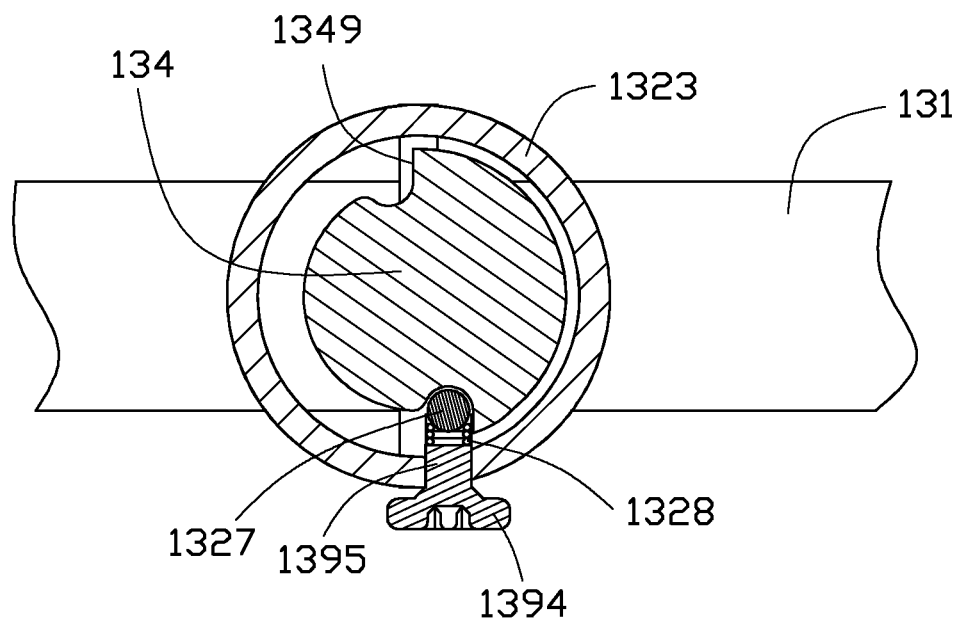
FIG. 6 is a schematic, enlarged cutaway view of part of the rotatable mechanism of FIG. 4, taken along line VI-VI thereof, and showing the rotatable mechanism in a first operation state corresponding to the initial state of the electrical device.
Figure 7:
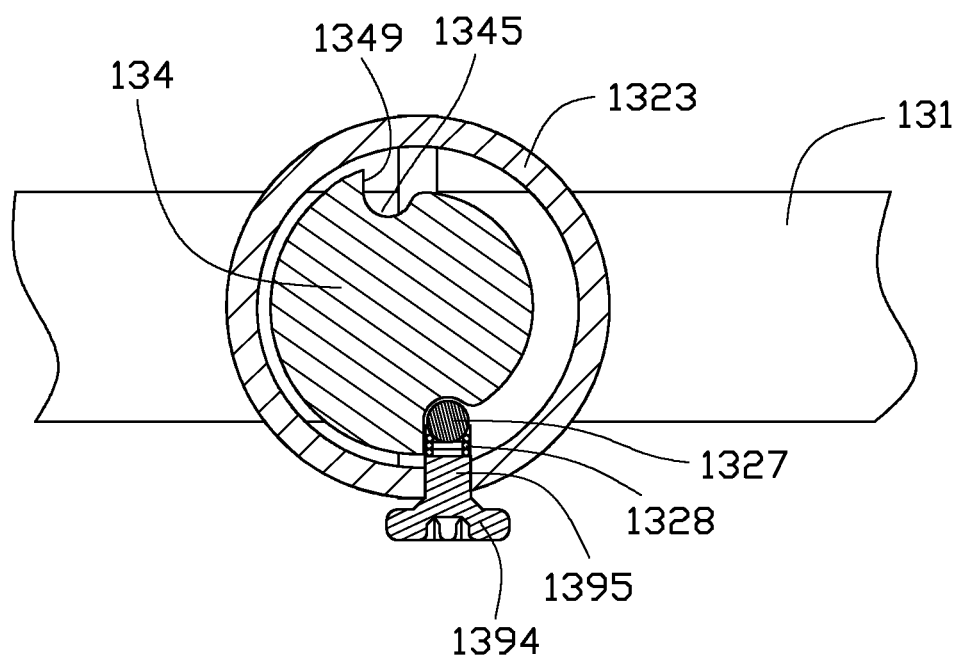
FIG. 7 is similar to FIG. 6, but showing the rotatable mechanism in a second operation state corresponding to the use state of the electrical device.
Figure 8:
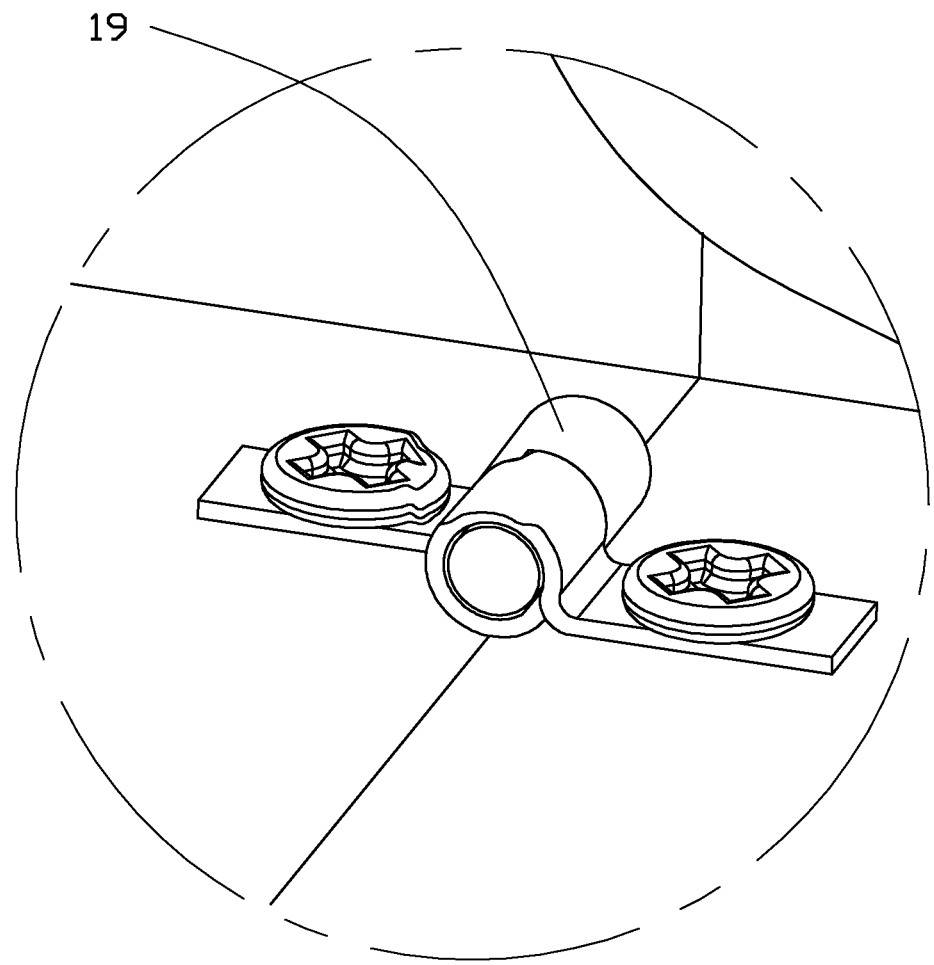
FIG. 8 is an enlarged view of a circled portion VIII of FIG. 3.

In assembly, the first shaft 134 is first received in the holding shell 1323. The shaft part 1340 of the first shaft 134 passes through and protrudes out from the second opening 1321 to be connected with the rear side of the first main body 12. After that, the holding shell 1323 is sleeved over the supporting body 1325 via the first opening, until the two second fixing holes 1320 are aligned with the first fixing hole 1350. Then, the fixing pole 1326 is passed through the first fixing hole 1350 and the two second fixing holes 1320 to fix the first end of the holding shell 1323 to the supporting part 1325. Next, the pole part 1395 of the screw 1329 is threaded into the blocking hole 1322 and fixed therein. As a result, the resisting unit 1327 is elastically held between the elastic member 1328 and the second semi-cylindrical surface 1342, and is movable along a semicircular path of the semi-cylindrical surface 1342. Finally, the two ends of the second shaft 131 are received in the second shaft sleeves 133, and the connecting parts 1332 are fixed to the rear side of the second main body 15 by the screws. When the electrical device 1 is folded up and in the initial state, the resisting unit 1327 is received in one of the two opposite grooves 1345, as shown in FIG. 6. When the electrical device 1 is opened up and in the use state, the resisting unit 1327 is received in the other one of the two opposite grooves 1345, as shown in FIG. 7.

In one embodiment, the primary body 150 can be a main alphabetic keyboard, and each of the two auxiliary bodies 153 can be selected from the group consisting of a number keypad, a direction keypad, and a function keypad. In other alternative embodiments, the two auxiliary bodies 153 can be omitted, to make the electrical device 1 thinner.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of shape, size and arrangement of parts within the principles of the present invention to the full extent indicated by the broad general meaning of the terms in which the appended claims are expressed.

What is claimed is:

1. An electrical device comprising:
a first main body;
a second main body; and
a rotatable mechanism pivotally connecting the first main body and the second main body,
wherein the rotatable mechanism comprises:
a first rotation unit configured to allow the first main body to rotate around a second rotation axis in a plane perpendicular to the second rotation axis, the first rotation unit comprises a first shaft sleeve and a first shaft pivotally received in the first shaft sleeve, and the first shaft is rotatable relative to the first shaft sleeve around the second rotation axis; and
a second rotation unit configured to allow the first main body to rotate relative to the second main body around a first rotation axis, and the second rotation unit comprises a second shaft and two second shaft sleeves pivotally receiving two ends of the second shaft, the first shaft sleeve is perpendicularly fixed relative to the second shaft, and the first rotation unit together with the second shaft is rotatable relative to the two second shaft sleeves around the first rotation axis when the electrical device is in a use state.

2. The electrical device of claim 1, wherein the first rotation axis is parallel to adjacent edges of the first main body and the second main body.

3. The electrical device of claim 1, wherein the first rotation axis is perpendicular to the second rotation axis.

4. The electrical device of claim 1, wherein the first main body is a display device and includes a display surface perpendicular to the second rotation axis.

5. The electrical device of claim 4, wherein the first main body comprises a display surface and a bottom surface at opposite sides thereof.

6. The electrical device of claim 5 wherein the second main body comprises a keypad surface and a supporting surface at opposite sides thereof.

7. The electrical device of claim 6, wherein the first main body overlies the second main body when the electrical device is in an initial state.

8. The electrical device of claim 7, wherein the first main body is rotatable 180 degrees around the second rotation axis from the initial state, and after such rotation the electrical device is in a use state.

9. The electrical device of claim 8, wherein the display surface and the keypad surface are arranged facing upward, and the bottom surface and the supporting surface are arranged facing downward after the first main body has been rotated 180 degrees to put the electrical device in the use state.

10. The electrical device of claim 8, wherein the first main body is rotatable around the first rotation axis when the electrical device is in the use state.

11. The electrical device of claim 8, wherein the first main body is rotatable up such that an included angle is defined between the first main body and the second main body when the electrical device is in the use state.

12. The electrical device of claim 1, wherein the first rotation unit is mounted to the first main body and the second rotation unit is mounted to the second main body.

13. The electrical device of claim 1, wherein the first shaft sleeve comprises a holding shell, a blocking unit, a supporting body, and a blocking hole, the supporting body extends from the second shaft, a first end of the holding shell is fixed to the supporting body by the fixing pole, and the blocking unit is fixed in the blocking hole.

14. The electrical device of claim 13, wherein the holding shell comprises an opposite second end defining an opening, and the first shaft comprises a shaft part protruding out from the opening and a blocking part rotatably received in the holding shell.

15. The electrical device of claim 14, wherein the blocking part comprises a first semi-cylindrical surface and a second semi-cylindrical surface, and a pair of blocking surfaces connected between the first semi-cylindrical surface and the second semi-cylindrical surface, and a diameter of an imaginary cylinder of which the first semi-cylindrical surface is a part is larger than a diameter of an imaginary cylinder of which the second semi-cylindrical surface is a part.

16. The electrical device of claim 15, wherein the shaft part comprises an outer cylindrical surface coplanar with the second semi-cylindrical surface of the blocking part.

17. The electrical device of claim 1, wherein the second main body comprises a primary body and two auxiliary bodies pivotally connected to two opposite lateral sides of the primary body, respectively.

18. An electrical device comprising: a first main body; a second main body comprising a main surface; and a rotatable mechanism pivotally connecting the first main body and the second main body at adjacent edges of the first main body and the second main body, wherein the rotatable mechanism comprises: a first rotation unit configured to allow the first main body to rotate around a second rotation axis in a plane perpendicular to the second rotation axis, the first rotation unit comprises a first shaft sleeve and a first shaft pivotally received in the first shaft sleeve, and the first shaft is rotatable relative to the first shaft sleeve around the second rotation axis; and a second rotation unit configured to allow the first main body to rotate relative to the second main body around a first rotation axis that is parallel to the adjacent edges of the first main body and the second main body, and the second rotation unit comprises a second shaft and two second shaft sleeves pivotally receiving two ends of the second shaft, the first shaft sleeve is perpendicularly fixed relative to the second shaft, and the first rotation unit together with the second shaft is rotatable relative to the two second shaft sleeves around the first rotation axis when the electrical device is in a use state.

* * * * *